US005556190A

United States Patent [19]
Saijo

[11] Patent Number: 5,556,190
[45] Date of Patent: Sep. 17, 1996

[54] HEADLAMP FOR A VEHICLE

[75] Inventor: Akira Saijo, Shizuoka, Japan

[73] Assignee: Koito Manufacturing Co., Ltd., Tokyo, Japan

[21] Appl. No.: 449,096

[22] Filed: May 24, 1995

[30] Foreign Application Priority Data

May 24, 1994 [JP] Japan .................................. 6-109232

[51] Int. Cl.$^6$ ..................................... H01R 33/00
[52] U.S. Cl. ........................ 362/226; 362/80; 362/368
[58] Field of Search ........................ 362/226, 61, 80, 362/83, 368

[56] References Cited

U.S. PATENT DOCUMENTS

| | | | |
|---|---|---|---|
| 4,677,532 | 6/1987 | Peitz et al. | 362/61 |
| 4,903,173 | 2/1990 | Mochizuki et al. | 362/66 |
| 4,920,463 | 4/1990 | Montet | 362/226 |
| 4,928,215 | 5/1990 | Fujino et al. | 362/420 |
| 5,111,368 | 5/1992 | Suzuki et al. | 362/61 |
| 5,117,335 | 5/1992 | Yamada | 362/61 |
| 5,119,276 | 6/1992 | Suzuki | 362/61 |
| 5,172,972 | 12/1992 | Terao | 362/66 |
| 5,283,719 | 2/1994 | Sekiguchi | 362/61 |

*Primary Examiner*—Denise L. Gromada
*Assistant Examiner*—Alfred Basichas
*Attorney, Agent, or Firm*—Sughrue, Mion, Zinn, Macpeak & Seas

[57] ABSTRACT

In the headlamp for use in a vehicle, a bulb is inserted into a bulb insertion hole formed in a reflector disposed within a lamp body from behind the reflector, the bulb is fixed to and held in the bulb insertion hole by a set spring provided in the peripheral edge portion of the bulb insertion hole, and an opening for bulb replacement is formed in the lamp body. According to the headlamp, the opening for bulb replacement is formed in the upper wall of the lamp body, thereby allowing the bulb to be replaced from above the headlamp.

10 Claims, 9 Drawing Sheets

HEADLAMP FOR A VEHICLE

BACKGROUND OF THE INVENTION

The present invention relates to a headlamp for use in a vehicle which includes on the back surface side of a lamp body an opening for replacement of a bulb serving as a light source inserted into a reflector and, in particular, to a headlamp of a type that the bulb is fixed to and held in a bulb insertion hole formed in the reflector by a set spring which can be simply operated with fingertips.

Figure 13:
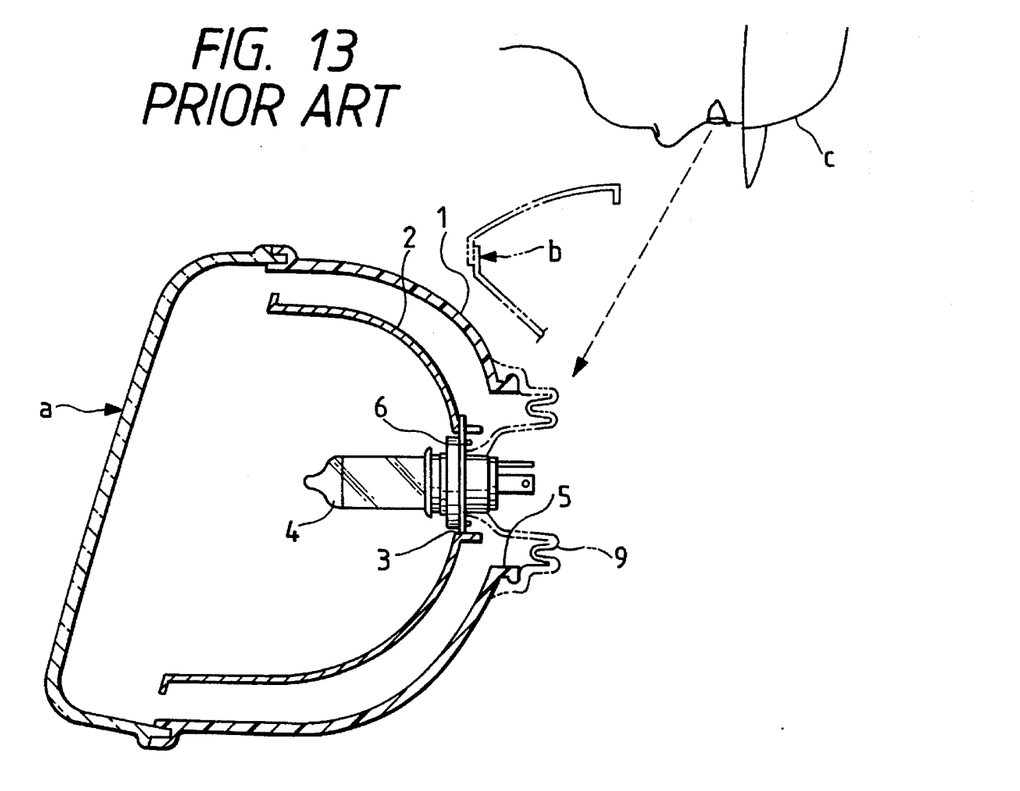
FIG. 13 is a longitudinal section view of a conventional headlamp.
Figure 14:
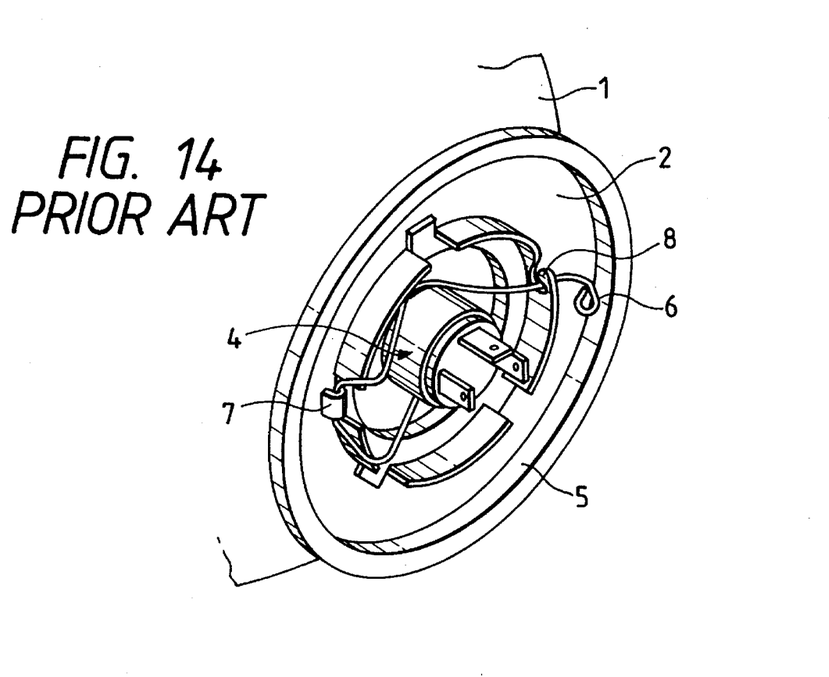
FIG. 14 is a perspective view of the neighborhood of an opening for bulb replacement formed in the conventional headlamp.

As a conventional headlamp of this type, as shown in FIGS. 13 and 14, there is known a structure in which a bulb insertion hole 3 is formed in the back top portion of a reflector 2 stored in a lamp body 1 and an opening 5 for replacement of a bulb is formed in the back wall of the lamp body 1 opposite to the bulb insertion hole 3. In the peripheral edge portion of the bulb insertion hole 3, there is provided a set spring 6 which is used to fixedly hold a bulb 4 in the bulb insertion hole 3. That is, the set spring 6 can be swung about a hinge 7 provided in the peripheral edge portion of the bulb insertion hole 3, and a hook 8 for securing the set spring 6 is projectingly provided at the position of the peripheral edge portion of the bulb insertion hole 3 opposite to the hinge 7. The set spring 6 is secured to and removed from the hook 8 by use of fingertips inserted from the opening 5, then the bulb 4 can be replaced through the opening 5. In FIG. 13, a rubber cover 9 is mounted between the cap rear end portion of the bulb 4 and the opening 5 for closing the opening 5. The cover 9 can be mounted and removed in a simple manner when replacing the bulb 4.

However, in the above-mentioned conventional headlamp, because the opening 5 for bulb replacement is generally formed in the substantially central portion of the back wall of the lamp body 1, when replacing the bulb 4 while a lamp a is being assembled to a vehicle body b, as shown by an imaginary line in FIG. 13, an operator c must take a forced unreasonable attitude in which the head of the operator c is pushed into such a position as allows the operator c to see the bulb insertion hole 3, which results in a very poor efficiency in the bulb replacement operation.

SUMMARY OF THE INVENTION

The present invention aims at eliminating the drawbacks found in the above-mentioned conventional headlamp for use in a vehicle. Accordingly, it is an object of the invention to provide a headlamp for use in a vehicle which permits an easy bulb replacing operation.

In order to achieve the above objects, a first aspect of the present invention provides a headlamp for a vehicle comprising: a light bulb; a reflector accommodating the light bulb, the reflector having a bulb insertion hole into which the light bulb is inserted; and a lamp body for storing the reflector, the lamp body including, a front opening, a peripheral wall adjacent to the front opening, a back wall opposite to the front opening, and a replacement opening formed in the peripheral wall.

A second aspect of the invention provides the headlamp according to the first aspect, further comprising: a bulb holder fitted on rear end portion of the light bulb, the bulb holder extending up to a position adjacent to the replacement opening of the lamp body.

A third aspect of the invention provides the headlamp according to the first aspect, further comprising: a set spring for fixing the light bulb in the bulb insertion hole of said reflector.

Since the bulb insertion hole is formed in a given side wall of the lamp body, an operator can see the bulb insertion hole sufficiently from laterally of a headlamp without pushing his head so deeply into a hood so as to view the back surface of the lamp body.

Further, fingers are inserted into a clearance between the reflector and lamp body from the bulb replacing opening formed in the side wall of the lamp body to remove the engagement of the bulb caused by the set spring. And, the bulb holder is pulled out toward the operator to draw out an old bulb through the clearance between the reflector and lamp body, and the old bulb is then taken out through the opening for bulb replacement. Also, while a new bulb is hung down with the bulb holder thereof pinched with fingers, the new bulb is inserted into the clearance between the reflector and lamp body from the opening for bulb replacement and is guided to the bulb insertion hole. At the same time, the operator's fingers are inserted into the clearance between the reflector and lamp body to set the set spring. In this manner, since the operator is able to hold the bulb with his fingers and move the same along the clearance between the lamp body and reflector, the bulb can be replaced smoothly even if the clearance between the lamp body and reflector is so narrow that fingertips can barely be inserted.

DETAILED DESCRIPTION OF THE PREFERRED EMBODIMENTS

The description will be given below in detail of an embodiment of a headlamp for use in a vehicle according to the invention.

Figure 1:
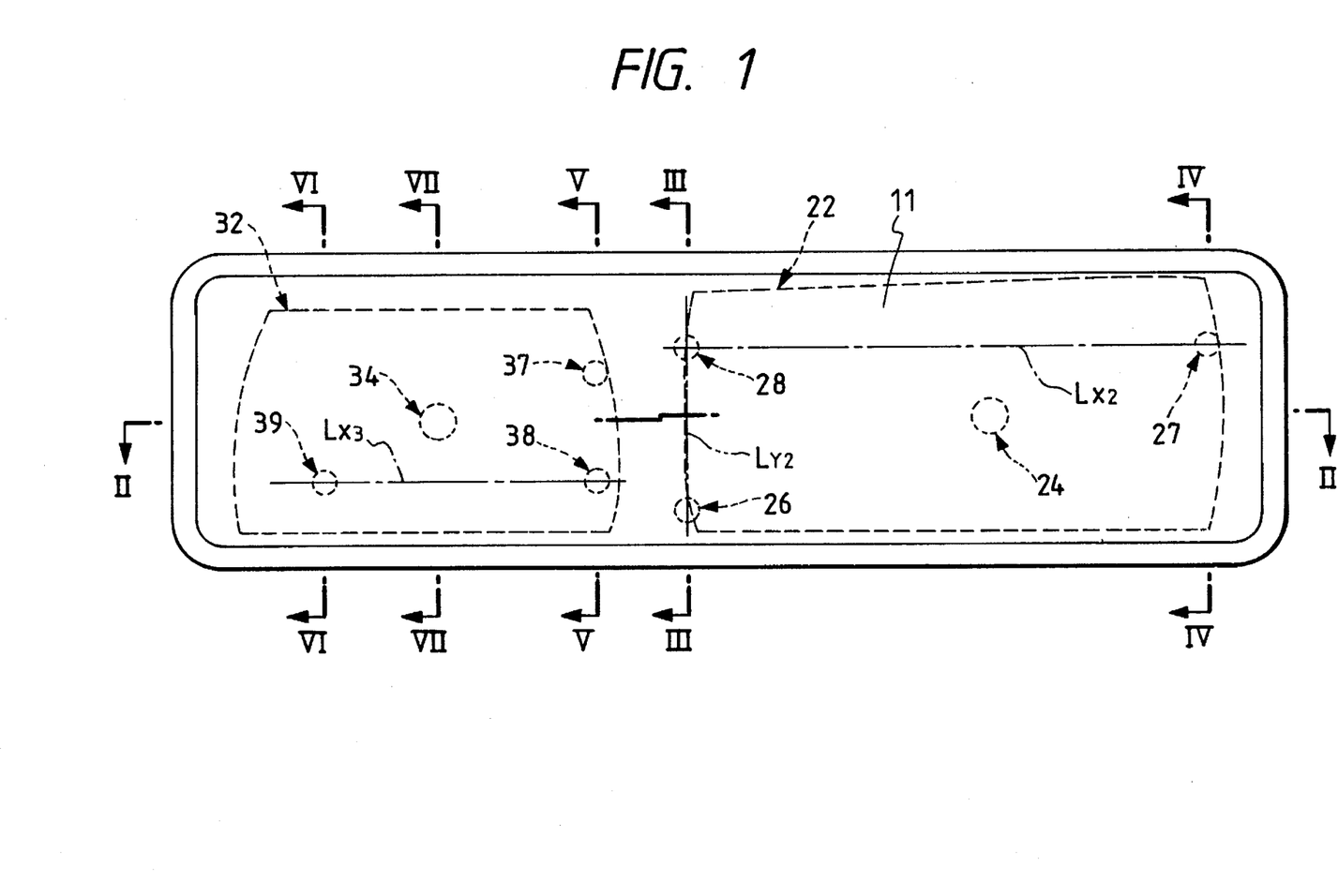
FIG. 1 is a front view of an embodiment of a headlamp for use in a vehicle according to the invention.
Figure 2:
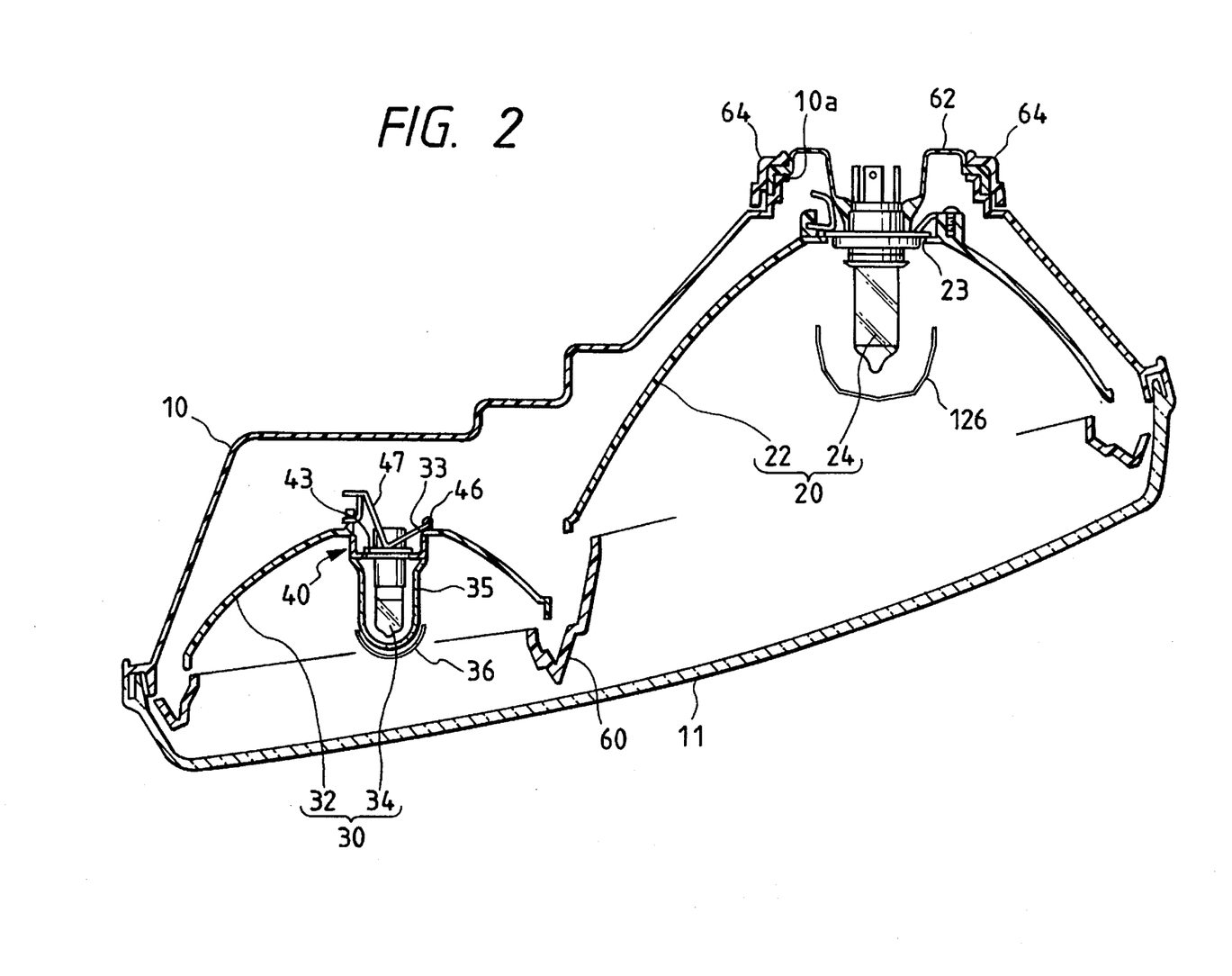
FIG. 2 is a horizontal section view of the above headlamp (that is, a section view taken along the line II—II shown in FIG. 1)
Figure 3:
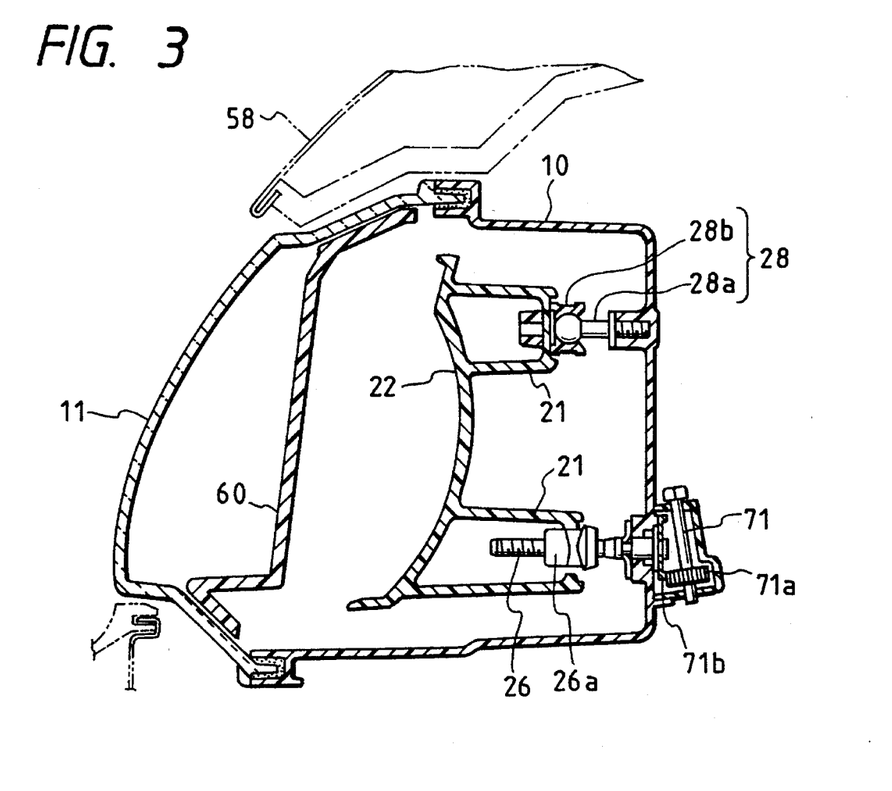
FIG. 3 is a longitudinal section view of the above headlamp (that is, a section view taken along the line III—III shown in FIG. 1)
Figure 4:
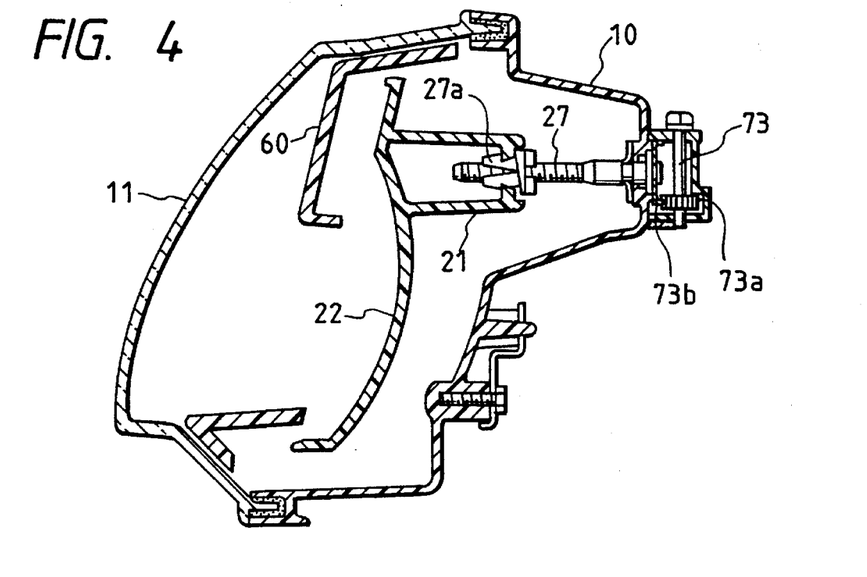
FIG. 4 is a longitudinal section view of the above headlamp (that is, a section view taken along the line IV—IV shown in FIG. 1)
Figure 5:
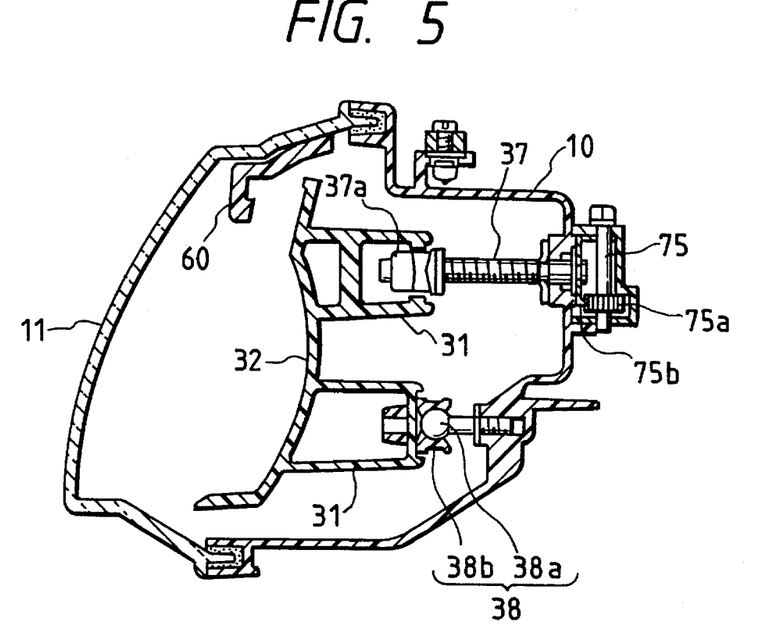
FIG. 5 is a longitudinal section view of the above headlamp (that is, a section view taken along the line V—V shown in FIG. 1)
Figure 6:
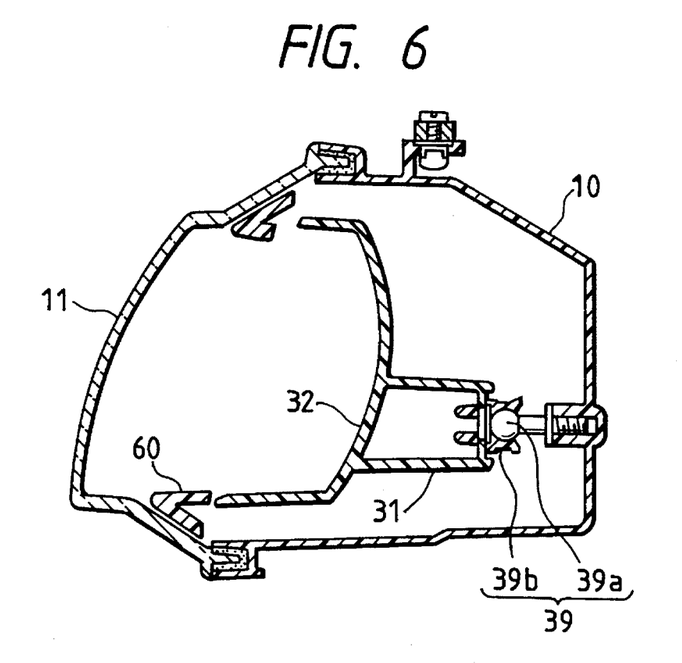
FIG. 6 is a longitudinal section view of the above headlamp (that is, a section view taken along the line VI—VI shown in FIG. 1)
Figure 7:
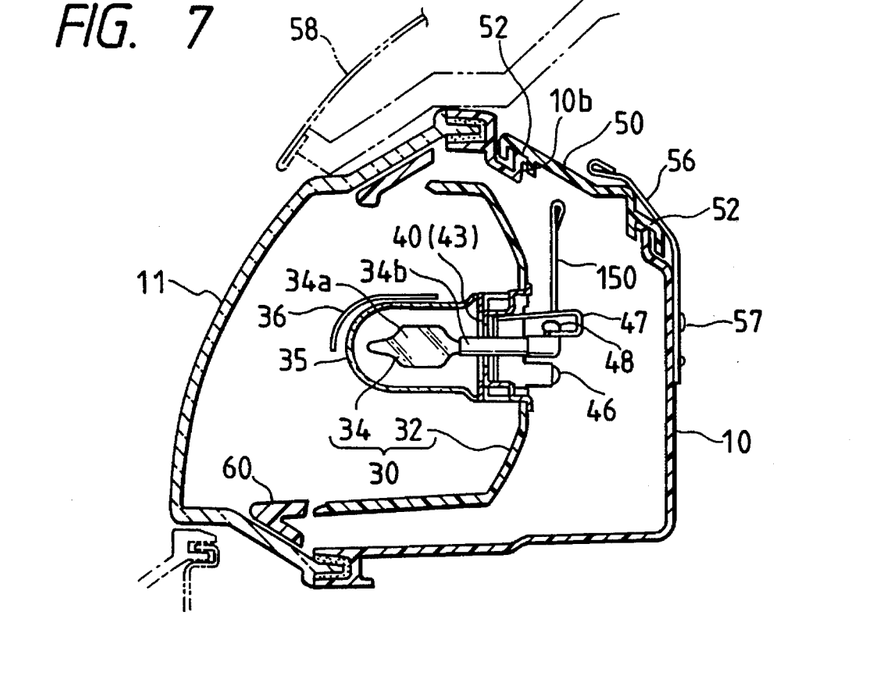
FIG. 7 is a longitudinal section view of the above headlamp (that is, a section view taken along the line VII—VII shown in FIG. 1)
Figure 8:
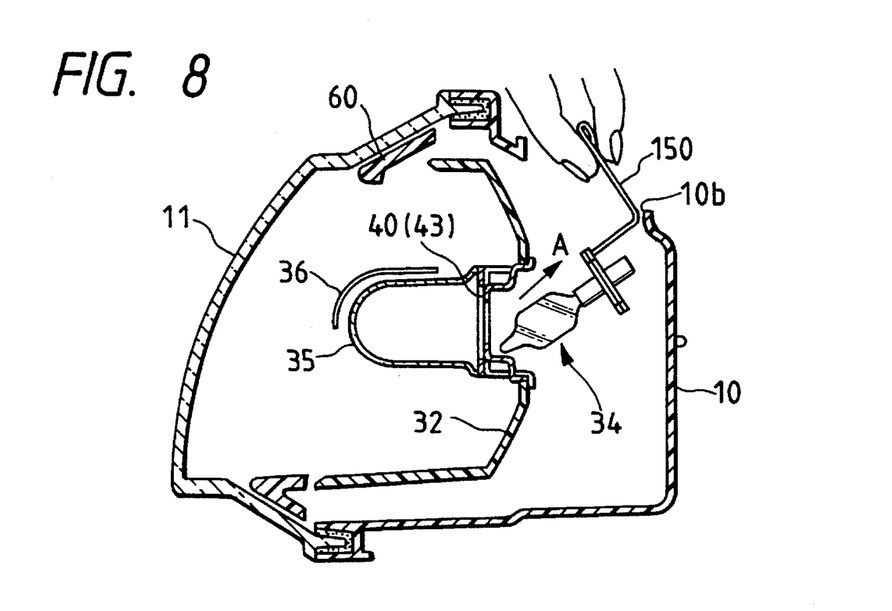
FIG. 8 is an explanatory view to show how to replace a bulb employed in a fog lamp.
Figure 9:
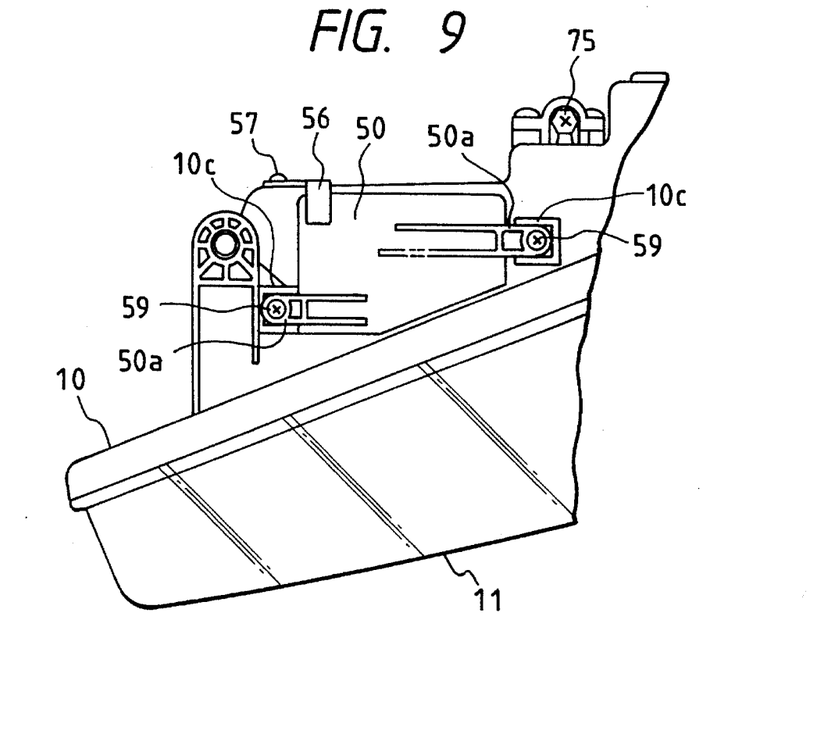
FIG. 9 is a plan view of a fog lamp position in the above headlamp.
Figure 10:
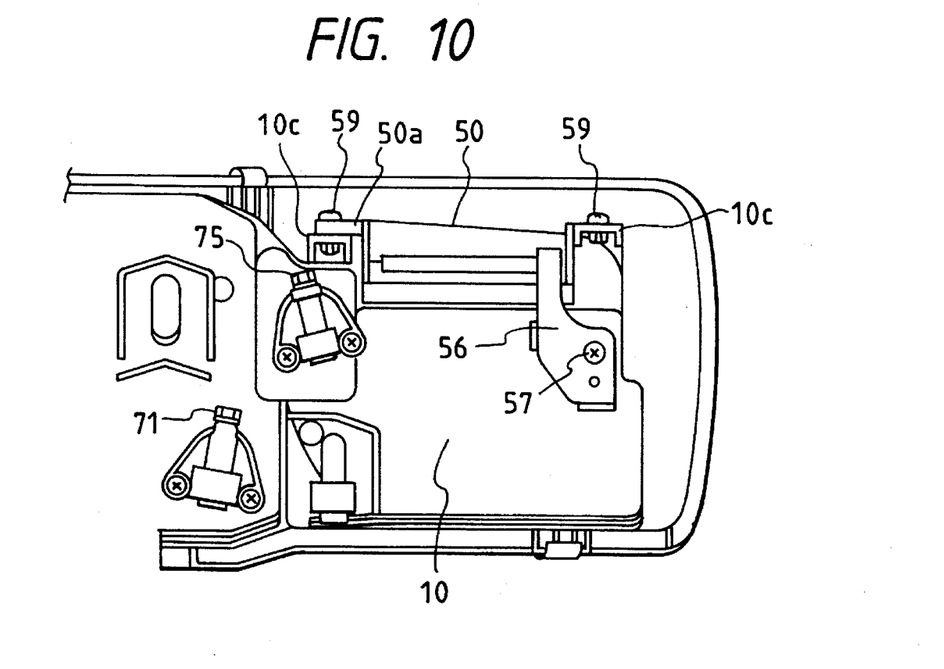
FIG. 10 is a back view of a fog lamp position in the above headlamp.
Figure 11:
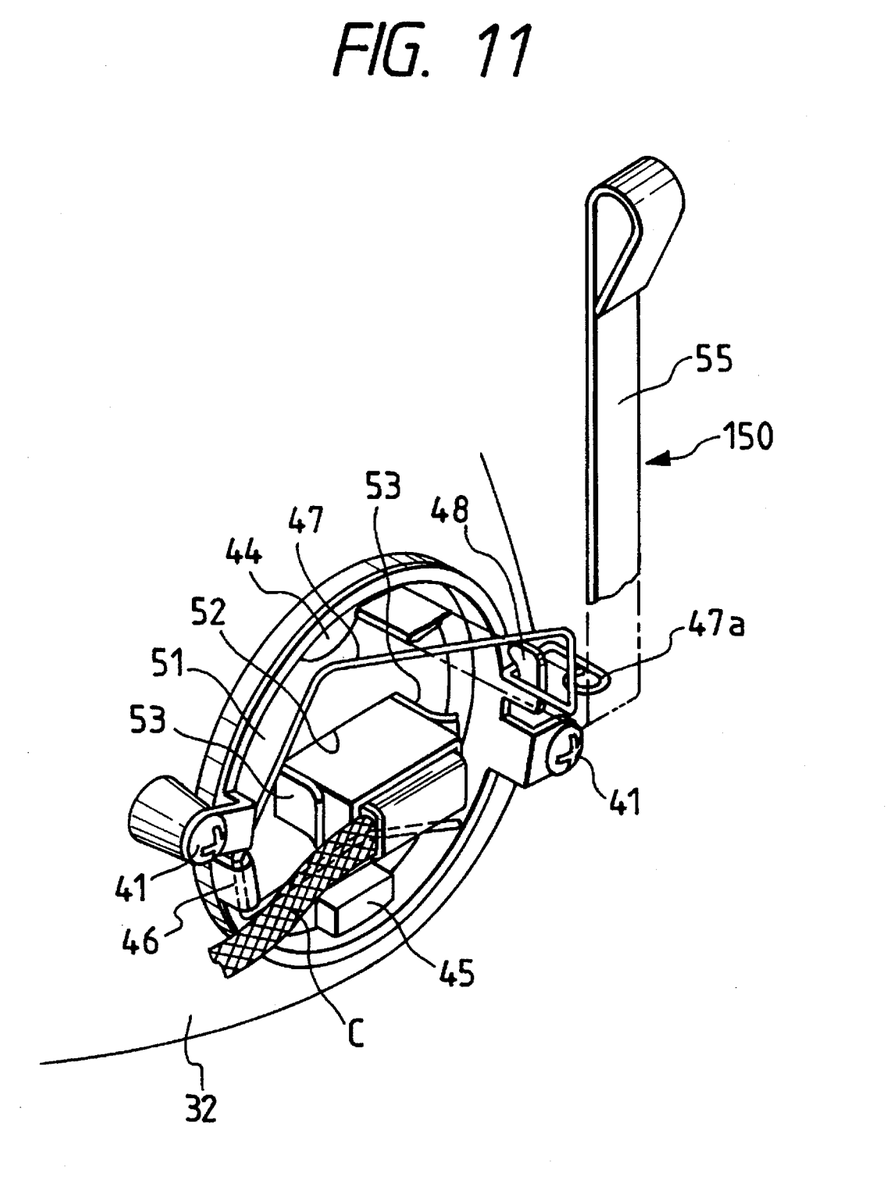
FIG. 11 is a perspective view of a bulb insertion hole formed in a fog lamp, when viewed from behind.
Figure 12:
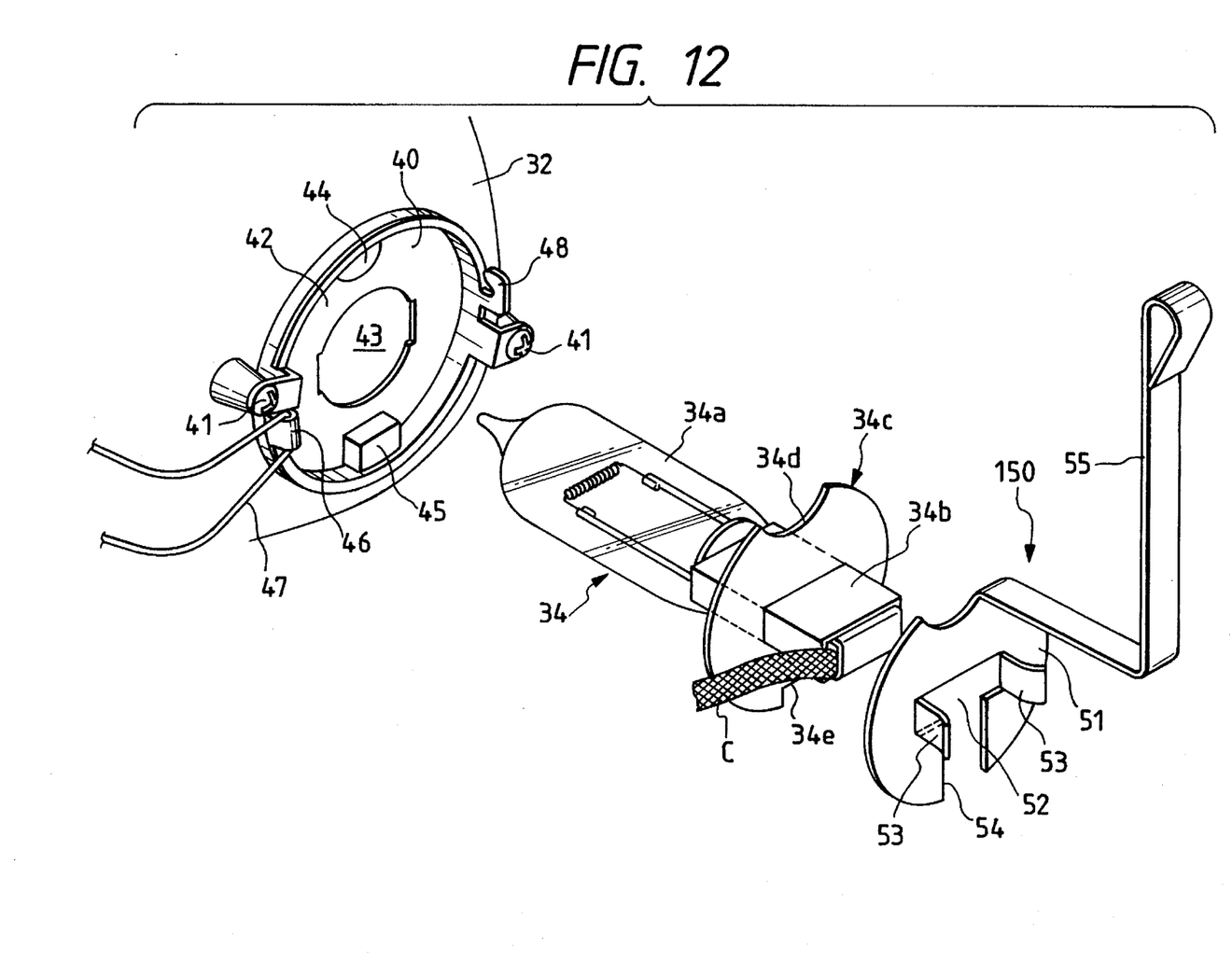
FIG. 12 is an exploded perspective view of a bulb to be inserted into the above bulb insertion hole.

In FIGS. 1 to 12, there is shown an embodiment of a headlamp for use in a vehicle according to the invention. In particular, FIG. 1 is a front view of the present headlamp for use in a vehicle, FIG. 2 is a horizontal section view of the present headlamp (that is, a section view taken along the line II—II shown in FIG. 1), FIGS. 3 to 7 are respectively longitudinal section views of the present headlamp, respectively taken along the lines III—III, IV—IV, V—V, VI—VI, and VII—VII, FIG. 8 is an explanatory view to explain how to replace a bulb used in a fog lamp, FIG. 9 is a plan view of the position of a fog lamp used in the present headlamp, FIG. 10 is a back view of the position of a fog lamp used in the present headlamp, FIG. 11 is a perspective view of the neighborhood of a bulb insertion hole formed in the fog lamp, when viewed from behind, and FIG. 12 is an exploded perspective view of a bulb to be inserted into the above bulb insertion hole.

In these figures, a container-shaped lamp body 10 opens forwardly, and a front lens 11 is assembled to the front opening of the lamp body 10 to thereby define a lamp chamber space. Within the lamp chamber space, there are disposed a headlamp main body 20 and a fog lamp main body 30 in parallel to each other. The headlamp main body 20 includes a parabolic reflector 22 with aluminum evaporated on the surface thereof and a bulb 24 inserted into a bulb insertion hole 23 formed in the reflector 22, while the fog lamp main body 30 includes a parabolic reflector 32 with aluminum evaporated on the surface thereof and a bulb 34 inserted into a bulb insertion hole 43 formed in the reflector 32. A passing beam forming shade 126 blocks off part of the light running for the headlamp reflector 22 to thereby contribute to the formation of a passing beam. A disk-shaped bulb insertion hole forming member 40 (which is hereinafter referred to as a hole forming member) is inserted into and fixed to a circular hole 33 formed in the back top portion of the fog lamp reflector 32 to thereby form a bulb insertion hole 43. A yellow globe 35, which turns a white light emitted from the bulb 34 into a yellow light, is staked and fixed to the front end portion of the hole forming member 40. A shade 36 is fixed to the yellow globe 35 to cut off the light that goes upwardly of the horizontal line.

Also, the headlamp main body 20 is supported inclinable with respect to the lamp body 10 by an aiming mechanism which includes two aiming screws 26 and 27 and a ball joint 28. On the other hand, the fog lamp main body 30 is supported inclinable with respect to the lamp body 10 by another aiming mechanism which includes an aiming screw 37 and two ball joints 38 and 39. The aiming screws 26, 27 and 37, which extend forwardly through the back wall of the lamp body 10, are supported such that they are rotatable in the extend-through portion of the back wall of the lamp body 10. The aiming screws 26, 27 and 37 are threadedly engageable with nuts 26a, 27a and 28a respectively. Support portions 28b, 38b and 39b respectively support ball portions 28a and 38a and 39a respectively provided on and projected from the back wall of the lamp body 10, and the support portions 28b, 38b and 39b are respectively fitted with brackets 21 and 31 which are respectively formed integral with the reflectors 22 and 32. In the headlamp, if the aiming screws 26 and 27 are rotated, then the headlamp main body 20 can be inclined about a horizontal axis $Lx_2$ and a vertical axis $Ly_2$, which makes it possible to incline and adjust the light radiation direction of the headlamp in both the vertical and horizontal directions. On the other hand, in the fog lamp, if the aiming screw 37 is rotated, then the fog lamp main body 30 can be inclined about a horizontal axis $Lx_3$, thereby being able to incline and adjust the light radiation direction of the fog lamp in the vertical direction. In FIGS. 3, 4, 5, 9 and 10, rotational operation shafts 71, 73 and 75 are used to rotate the aiming screws 26, 27 and 37. And, spur gears 71a, 73a and 75a, which are disposed on the side of the operation shafts 71, 73 and 75, respectively mesh with crown gears 71b, 73b and 75b on the side of the aiming screws 26, 27 and 37 to thereby serving as an orthogonal change gear mechanism.

A rectangular-frame-shaped extension reflector 60 includes openings corresponding to the reflector 22 of the headlamp main body 20 and to the reflector 32 of the fog lamp main body 30. The extension reflector 60 also extends from a position adjacent to the reflectors 22 and 32 to a position adjacent to the upper and lower side walls as well as right and left side walls of the front lens 11. The extension reflector 60 is fixed to the front lens 11 or to the reflectors 22 and 32 by a given fixing means such as a screw or the like. The surface of the extension reflector 60, similarly to the reflectors 22 and 32, is subjected to the evaporated aluminum deposition, which can cover the peripheral areas of the headlamp main body 20 and fog lamp main body 30 and can show the whole of the interior of the lamp chamber space in a single mirror surface color to thereby improve the external appearance of the headlamp.

In FIG. 2, an opening 10a for bulb replacement is formed at such a position in the back wall of the lamp body 10 as corresponds to the bulb insertion hole 23 of the reflector 22. In the opening 10a, there is mounted a rubber cover 62 which is elastically engageable with the cap rear end portion of the bulb 24 inserted into the bulb insertion hole 23. A locking cap 64 is used to fixedly hold the rubber cover 62 to the opening 10a. And, to replace the bulb 24 of the headlamp, a hood 58 (see FIG. 3) may be lifted up and hand may be turned to behind the headlamp from above the headlamp.

On the other hand, an opening 10b for bulb replacement is formed on the fog lamp side. The opening 10b is not formed in the back wall of the lamp body like the opening 10a for bulb replacement on the headlamp side but, as shown in FIG. 7, it is formed at a position just above the bulb insertion hole 43 of the upper wall of the lamp body. A freely mountable and removable cap 50 is mounted on the opening 10b. In operation, if the cap 50 is removed, then the bulb 34 can be replaced from above the headlamp without turning hand from above the headlamp to the back side thereof. A packing 52 is interposed between the peripheral edge vertical wall of the opening 10b and the cap 50. In FIGS. 9 and 10, a screw 59 is used to fix the cap 50 to the opening 10b. That is, a bracket 50a formed with and extending from the cap 50 is fixed to a bracket 10c provided on the lamp body side by the screw 59. A metal plate spring 56 is screwed in the lower end portion thereof to the back wall of the lamp body and extends upwardly along the upper wall of the lamp body to secure the cap 50 to the opening 10b provisionally. The plate spring 56 also has a function to energize the cap 50 in a direction to press it against the opening 10b to thereby be sure to seal an engaging portion between the cap 50 and opening 10b. A screw 57 is used to fix the plate spring 56 to the lamp body 10.

The bulb 34 is structured such that the base portion of a glass globe 34a is combined integrally with a metal cap 34b having a rectangular cross section, while a flange-shaped focus ring 34c for positioning the bulb 34 with respect to the reflector 32 is spot welded to the cap 34b. The bulb insertion hole 43 is defined by the hole forming member 40 which is fitted into the circular hole 33 formed in a back top portion of the reflector 32 and is fixed by a screw (reference character 41 designates the screw), while the circular bottom surface area 42 of tile hole forming member 40 forms a reference contact surface to set the position of the bulb 34 in the axial direction thereof since the front surface of the focus ring 34c of the bulb comes into contact with this bottom area 42. Also, at upper and lower positions over the bulb insertion hole 43 of the bottom area 42, there are formed a pair of expanded portions 44 and 45 which respectively correspond to two cutaway portions 34d and 34e formed in the focus ring 34c of the bulb 34 for positioning the position of the bulb 34 in the peripheral direction thereof. Thus, when the cutaway portions 34d and 34e formed on the focus ring 34c side are respectively engaged with the expanded portions 44 and 45 on the bulb insertion hole 43 side, then the position of the bulb 34 in the peripheral direction thereof can be set.

Also, the peripheral edge portion of the hole forming member 40 is in part turned down and the turned-down portion forms the hinge portion 46 of the set spring 47 includes a linear spring. And, if the set spring 47 is secured to a hook 48 which is provided at a position opposite to the hinge portion 46 over the bulb insertion hole 43, then the focus ring 34c of the bulb 34 is pressed against and held by the bottom area 42 serving as the reference contact surface on the bulb insertion hole 43 side, so that the bulb 34 can be fixed to and held in the bulb insertion hole 43. An operation portion 47a is bent formed in the leading end portion of the set spring 47. That is, with the operation portion 47a pinched with fingers, the set spring 47 can be secured to and removed from the hook 48.

And, to the rear end portion of the cap 34b of the bulb 34, there is fitted and fixed a bulb holder 150 which includes an L-shaped extension portion 54. If the leading end portion of the extension portion 54 is pinched with fingertips, then the bulb 34 can be inserted into the bulb insertion hole 43 from the opening 10b and the bulb 34 inserted into the bulb insertion hole 43 can be removed from the bulb insertion hole 43 and thus can be taken out from the opening 10b. In other words, the bulb holder 150 is produced by cutting out metal material into a thin metal plate having a given shape and then bending the thin metal plate, and the bulb holder 150 includes a plate 51 having a disk shape matchable to the focus ring 34c of the bulb 34 and an extension portion 56 which is bent and extended from the plate 51. The plate 51 includes in the central portion thereof a rectangular hole 152 which includes a pair of right and left holding pieces 53 respectively cut and raised from the plate 51. The rear end portion of the bulb cap 34b is fitted with the rectangular hole 152 and is thus held by and between the holding pieces 53, so that the bulb holder 150 and bulb 34 can be combined with each other to form an integral body. A cutaway portion 54 is formed continuous with the rectangular hole 52. The cutaway portion 54 is used to pass a cord C, which is guided from the cap 34b, to the rectangular hole 52 side when the bulb holder 150 is fitted with the cap 34b.

Next, description will be given below of a procedure for replacing the bulb of the fog lamp.

At first, the screw 60 is removed and the cap 50 is removed from the opening 10b against the energization force of the plate spring 56. Next, fingers are inserted into the back surface of the reflector 32 from the opening 10b to remove the engagement of the set spring 47 by the hook 48. Then, the leading end portion of the bulb holder 150 is pinched with fingers and is pulled up diagonally and backwardly (that is, in FIG. 8, in a direction of an arrow A) to thereby take out the bulb 34 from the bulb insertion hole 43. After then, the leading end portion of the bulb holder 150 is pulled further upwardly to thereby remove the bulb 34 from the opening 10b. The bulb holder 150 is separated from the thus removed bulb 34 and the separated bulb holder 150 is then fitted integrally with a new bulb 34. With the bulb holder 150 remaining pinched with fingers, the new bulb 34 is inserted from the opening 10b along the back surface of the reflector 32 and is thus inserted into the bulb insertion hole 43 in a forward and diagonally downward direction (in FIG. 8, in an opposite direction to the arrow A). Next, fingertips are inserted from the opening 10b and the set spring 47 is turned and secured to the hook 48 with the fingertips, so that the new bulb 34 can be fixed to the bulb insertion hole 43. Then, the cap 50 is mounted onto the opening 10b and is secured to the opening 10b provisionally with the energization force of the plate spring 56 and, after then, the cap 50 is fixedly secured by use of a screw. Here, in the above embodiment, although the opening 10b for bulb replacement is formed in the upper wall of the lamp body 10, the position of provision of the opening 10b is not always limited to the upper wall of the lamp body 10 but, for example, the opening 10b may be formed in the right and left walls of the lamp body 10 or in the lower wall of the lamp body 10, according to its positional relationship with respect to parts provided on the vehicle body side.

As can be seen clearly from the foregoing description, in a headlamp for use in a vehicle according to the invention, since the opening for bulb replacement is formed in a given one of the side walls (such as the upper wall, right or left wall) of the lamp body, the bulb can be replaced from above the headlamp or from laterally or the right or left side thereof. Therefore, the operator can replace an old bulb with a new bulb in an easy attitude with his or her head positioned above the headlamp, without taking a forced unreasonable attitude with his or her head pushed into the hood so deeply as can visually view the back surface of the lamp body as in the conventional headlamp.

Also, as the opening for bulb replacement is provided in the side wall of the headlamp, there is eliminated the conventional restriction for the vehicle structure design that a given space for bulb replacing operation must always be provided in the back surface of the headlamp.

Further, since the bulb can be inserted and removed through the opening for bulb replacement with the bulb holder pinched and hung down with fingers and also since the fixed holding and removal of the bulb by the set spring can be achieved by use of fingertips inserted from the opening for bulb replacement, when compared with a case in which the bulb is directly pinched with fingers for insertion and removal through the opening for bulb replacement, the clearance between the reflector and lamp body can be reduced and thus, although the longitudinal length of the present headlamp is slightly longer than that of a conventional headlamp which includes an opening for bulb replacement in the back wall of the lamp body, the present headlamp will not be increased in size over the conventional headlamp.

What is claimed is:

1. A headlamp for a vehicle comprising:

a light bulb;

a reflector accommodating said light bulb such that said light bulb is parallel to a longitudinal direction of the vehicle, said reflector having a bulb insertion hole into which said light bulb is inserted; and a lamp body for storing said reflector, said lamp body including, a front opening, a peripheral wall adjacent to said front opening, a back wall opposite to said front opening, and a replacement opening formed in said peripheral wall.

2. A headlamp according to claim 1, wherein said replacement opening is formed in the upper side of said peripheral wall of said lamp body.

3. A headlamp according to claim 1, wherein said replacement opening is formed in the lower side of said peripheral wall of said lamp body.

4. A headlamp according to claim 1, wherein said replacement opening is formed in the right side of said peripheral wall of said lamp body.

5. A headlamp according to claim 1, wherein said replacement opening is formed in the left side of said peripheral wall of said lamp body.

6. A headlamp according to claim 1, further comprising:

a set spring for fixing said light bulb in said bulb insertion hole of said reflector.

7. A headlamp according to claim 6, wherein said set spring includes a bent portion formed at a leading end of said set spring.

8. A headlamp for a vehicle comprising:

a light bulb;

a reflector accommodating said light bulb, said reflector having a bulb insertion hole into which said light bulb is inserted;

a lamp body for storing said reflector, said lamp body including, a front opening, a peripheral wall adjacent to said front opening, a back wall opposite to said front opening, and a replacement opening formed in said peripheral wall; and a bulb holder fitted on a rear end portion of said light bulb, said bulb holder having an L-shaped extending portion extending up to a position adjacent to said replacement opening of said lamp body.

9. A headlamp for a vehicle comprising:

a light bulb;

a reflector accommodating said light bulb, said reflector having a bulb insertion hole into which said light bulb is inserted;

a lamp body for storing said reflector, said lamp body including, a front opening, a peripheral wall adjacent to said front opening, a back wall opposite to said front opening, and a replacement opening formed in said peripheral wall;

a cap detachably fitting in said replacement opening of said lamp body; and a plate spring, which is separate and distinct from said cap, attached on said back wall of said lamp body, for urging said cap against said replacement opening of said lamp body.

10. A headlamp for a vehicle comprising;

a light bulb;

a reflector accommodating said light bulb, said reflector having a bulb insertion hole into which said light bulb is inserted;

a lamp body for storing said reflector, said lamp body including, a front opening, a peripheral wall adjacent to said front opening, a back wall opposite to said front opening, and a replacement opening formed in said peripheral wall;

a cap detachably fitting in said replacement opening of said lamp body; and a sealing member interposed between said replacement opening and said cap.

* * * * *